(12) United States Patent
Scott et al.

(10) Patent No.: US 9,240,111 B2
(45) Date of Patent: Jan. 19, 2016

(54) INFERRING BUILDING METADATA FROM DISTRIBUTED SENSORS

(75) Inventors: James W. Scott, Cambridge (GB); Ionut Constandache, Bellevue, WA (US); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1200 days.

(21) Appl. No.: 12/899,204

(22) Filed: Oct. 6, 2010

(65) Prior Publication Data

US 2012/0086568 A1 Apr. 12, 2012

(51) Int. Cl.
*G08B 23/00* (2006.01)
*G08B 13/00* (2006.01)
*G05B 15/02* (2006.01)
*G08B 21/22* (2006.01)

(52) U.S. Cl.
CPC ............... *G08B 13/00* (2013.01); *G05B 15/02* (2013.01); *G08B 21/22* (2013.01)

(58) Field of Classification Search
CPC ......... G08B 13/00; G08B 21/22; G05B 15/02
USPC ............ 340/501, 566, 505, 539.26, 540, 541;
348/148, 500, 164, 461, 218.1, 584,
348/E5.024, E9.055; 370/503; 455/456.1
See application file for complete search history.

(56) References Cited

U.S. PATENT DOCUMENTS

| | | | |
|---|---|---|---|
| 6,912,429 B1 | 6/2005 | Bilger | |
| 7,327,245 B2 | 2/2008 | Krumm et al. | |
| 7,444,383 B2 | 10/2008 | Horvitz | |
| 7,706,965 B2 | 4/2010 | Downs et al. | |
| 7,720,364 B2 | 5/2010 | Scott et al. | |
| 7,974,314 B2 * | 7/2011 | Kroepfl et al. | 370/503 |
| 8,005,767 B1 * | 8/2011 | Cassella | 706/12 |
| 8,428,088 B2 * | 4/2013 | Kroepfl et al. | 370/503 |
| 8,441,354 B2 * | 5/2013 | Padmanabhan et al. | 340/572.1 |
| 2005/0254712 A1 * | 11/2005 | Lindeman | 382/224 |
| 2007/0256105 A1 | 11/2007 | Tabe | |
| 2008/0115086 A1 * | 5/2008 | Rupp et al. | 715/810 |

(Continued)

OTHER PUBLICATIONS

Gellersen, et al., "RELATE: Relative Positioning of Mobile Objects in Ad hoc Networks", retrieved on Oct. 12, 2010 at <<http://www.comp.lancs.ac.uk/research/projects/project.php?pid=181>>, Computing Department Lancaster University, Apr. 2005-Sep. 2008, pp. 1-2.

(Continued)

*Primary Examiner* — Hoi Lau
(74) *Attorney, Agent, or Firm* — Steve Wight; Judy Yee; Micky Minhas

(57) ABSTRACT

Inferring building metadata from distributed sensors is described. In an embodiment multiple sensors are situated at various locations in a building detecting physical quantities (e.g. light, heat, motion). The data from at least one sensor is analyzed in order to detect events occurring in proximity to the sensor. Data about an event detected at a first sensor is compared with events detected at other sensors in order to identify correlated events from which connections between the sensor locations can be inferred and a building layout generated. In some embodiments a threshold may be applied to the data in order to filter out false events. In some embodiments the building layout may be used as part of a building control system. In some embodiments the sensor data may be used to determine if the sensor has been moved.

20 Claims, 15 Drawing Sheets

(56) References Cited

U.S. PATENT DOCUMENTS

| | | | |
|---|---|---|---|
| 2008/0137800 A1* | 6/2008 | Ohba et al. | 377/19 |
| 2008/0276253 A1* | 11/2008 | Khandrika et al. | 719/318 |
| 2009/0236422 A1* | 9/2009 | Kleder | 235/411 |
| 2009/0254408 A1 | 10/2009 | McMillan | |
| 2009/0259271 A1* | 10/2009 | Allavatam et al. | 607/25 |
| 2009/0262206 A1* | 10/2009 | Park | 348/218.1 |
| 2009/0290852 A1* | 11/2009 | Wright | 386/95 |
| 2009/0307255 A1 | 12/2009 | Park | |
| 2010/0183034 A1* | 7/2010 | Kroepfl et al. | 370/503 |
| 2011/0128148 A1* | 6/2011 | Nierenberg et al. | 340/539.13 |
| 2011/0169638 A1* | 7/2011 | Krumhansl et al. | 340/566 |
| 2011/0183685 A1* | 7/2011 | Burton et al. | 455/456.1 |
| 2011/0210843 A1* | 9/2011 | Kummetz | 340/517 |
| 2011/0228091 A1* | 9/2011 | Kroepfl et al. | 348/148 |
| 2012/0015665 A1* | 1/2012 | Farley et al. | 455/456.1 |
| 2012/0086568 A1* | 4/2012 | Scott et al. | 340/501 |

OTHER PUBLICATIONS

Gellersen, et al., "Supporting Device Discovery and Spontaneous Interaction with Spatial References", retrieved on Jul. 19, 2010 at <<http://eprints.comp.lancs.ac.uk/1563/1/gellersen08supporting.pdf>>, Springer-Verlag London, Personal and Ubiquitous Computing, vol. 13, No. 4, May 2009, pp. 255-264.

LeMay, et al., "Collaborative Recommender Systems for Building Automation", retrieved on Jul. 19, 2010 at <<http://seclab.uiuc.edu/pubs/LeMayHG09.pdf>>, International Conference on System Sciences (HICSS), Waikoloa, Hawaii, Jan. 2009, pp. 1-10.

* cited by examiner

INFERRING BUILDING METADATA FROM DISTRIBUTED SENSORS

BACKGROUND

There are many reasons why users may want to locate sensors around a building, for example, to control the temperature or lighting of one or more rooms. In some examples, the control may be implemented within a room, e.g. a motion sensor in a room linked to the lights within the same room. In other examples there may be a number of sensors placed around the building and monitoring one or more parameters where the sensor data is transmitted to a central controller and can be used for central control of devices e.g. for security or fire alarm systems.

Where multiple sensors are used around a building, the controller requires significant amounts of information about the location and orientation of the sensors, the building floor plan, etc in order to accurately function. Entry of this data is time consuming and prone to human error and will become out of date if sensors are moved or new sensors added.

The embodiments described below are not limited to implementations which solve any or all of the disadvantages of known distributed sensor networks.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Inferring building metadata from distributed sensors is described. In an embodiment multiple sensors are situated at various locations in a building detecting physical quantities (e.g. light, heat, motion). The data from at least one sensor is analyzed in order to detect events occurring in proximity to the sensor. Data about an event detected at a first sensor is compared with events detected at other sensors in order to identify correlated events from which connections between the sensor locations can be inferred and a building layout generated. In some embodiments a threshold may be applied to the data in order to filter out false events. In some embodiments the building layout may be used as part of a building control system. In some embodiments the sensor data may be used to determine if the sensor has been moved.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
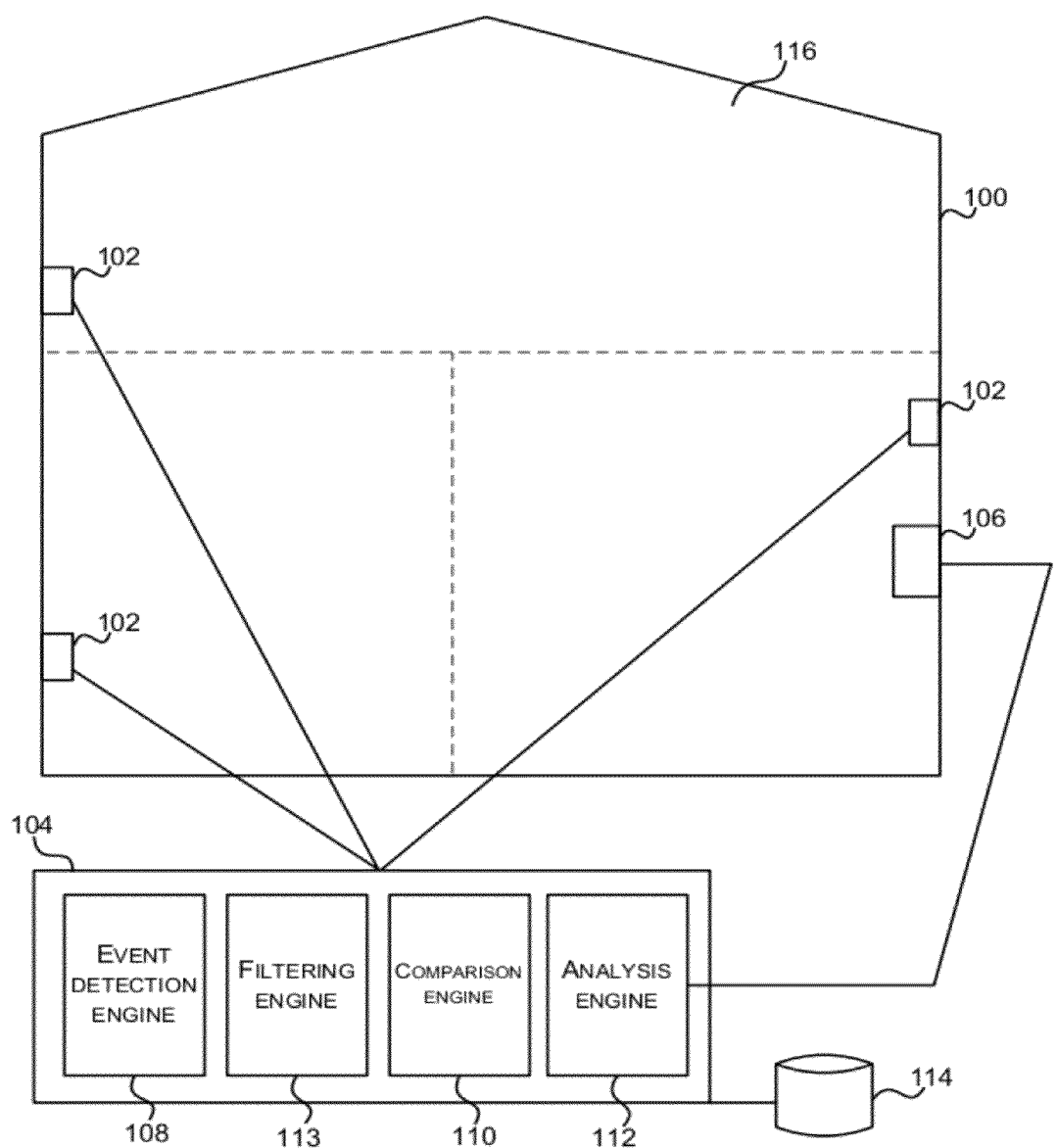
FIG. 1 is a schematic diagram of an example of a distributed sensor network.

FIG. 1 is a schematic diagram of a distributed sensor network. The system comprises a plurality of sensors 102 distributed throughout a building 100 and a controller 104 which receives sensor data from each of the sensors 102. The controller 104 comprises: an event detection engine 108, which analyzes the sensor data and detects events in streams of data from a particular sensor; a comparison engine 110 which compares events detected in different data streams and identifies correlated events; and an analysis engine 112, which generates (or infers) data about the building, which is referred to as 'metadata', based on the output of the comparison engine 110. The controller 104 may additionally comprise a filtering engine 113, which filters the detected events prior to use by the analysis engine 112 and the controller 104 may be connected to (or in communication with) a data store 114. The controller 104 may additionally be in communication with at least one further device 106 which may be part of a building system, such as a temperature control system or alarm system.

In the example shown in FIG. 1, the plurality of sensors 102 are situated in various locations around the building 100. Each sensor detects a physical quantity such as temperature, humidity, light or motion in a portion of the building 116 where the sensor is located. A non-exhaustive list of examples of types of sensors that may be used is; light sensors (e.g. visible light sensors, UV sensors, IR sensors, RGB sensors or sensors detecting any range of wavelengths), motion sensors (e.g. Passive Infra-Red (PIR) sensors, ultrasonic rangefinders, laser rangefinders), atmospheric sensors (e.g. temperature sensors, humidity sensors, pressure sensors, gaseous analysis sensors), microphones, magnetic sensors (e.g. magnetometers, compasses) and vibration sensors (e.g. accelerometers, inclinometers). However, any appropriate type of sensor may be used and the system may comprise a plurality of sensors of the same type or sensors of different types (e.g. a first plurality of sensors comprising a first type of sensor, such as PIR sensors, and a second plurality of sensors comprising a second type of sensor, such as light sensors).

The sensors may be situated such that there is one sensor per portion of a building 116. A portion of a building may, for example, be a room or independent space or may be a part of a room or any other part of a building. In an example where the system is used in conjunction with a building temperature control system, a portion of a building may be an independent controllable space (e.g. a room with a door). In some examples there may be a different number of sensors in a building portion (e.g. more than one sensor in a building portion or room) and some rooms may have no sensors. Where multiple sensors are located within the same portion of a room, these sensors may be of the same type or of different types and in some examples, sensors of different types may be integrated within a single sensing unit. Although FIG. 1 shows the sensors distributed within a single building 100, metadata may be inferred from any appropriate distributed network of sensors and in other examples the sensors may be distributed across a number of buildings or geographical locations. In some examples, there may be sensors located outside of the building(s) and these may be used for calibration purposes or to assist in generating metadata in other ways.

The sensors or sensing units may be equipped with a transmitter so that they can communicate with the controller 104. The sensors may transmit the sensor data continuously or in any other appropriate way, for example the sensors may periodically transmit the data as a compressed burst. The communication with the controller 104 may be via a direct link (as shown in FIG. 1) or via a communications network (not shown in FIG. 1). Where a communications network is used, it may be any appropriate network such as a Local Area Network (LAN), a Wide Area Network (WAN), a Public Switched Telephone Networks (PSTN), the Internet, a Virtual Private Networks (VPN) etc, or any combination thereof. In an example, the sensors may be equipped with a wireless transmitter such that they communicate via a wireless link with the controller 104. In other examples other types of transmitter may be used (e.g. an Ethernet transmitter) and the links between a sensor and the controller may be wired or wireless. Where a network is used, the network may be a wireless network or a wired network or combinations thereof.

As described above, the controller 104 comprises at least one input for receiving sensor data from the plurality of distributed sensors 102 and is arranged to automatically infer metadata from that sensor data. The metadata, which is data about the building, may describe the physical arrangement (or layout) of one or more portions of the building and may, for example, comprise a room adjacency graph (i.e. a list of connections between rooms), an auto-generated floor plan, details of door placement (e.g. denoting where there are doors between rooms), room size, room orientation, which floor of the building the room is on, the size, orientation and locations of windows within a room, and the properties of coverings (curtains, blinds, etc) fitted to those window etc. The metadata may also comprise location information, such as latitude and longitude, information about the building surroundings (e.g. height of neighboring buildings), information such as room use patterns (i.e. which rooms are used and at what times) or heat transfer patterns between rooms. Reference to rooms is by way of example only and may alternatively refer to other portions of a building (e.g. a part of a room, a floor etc).

The controller 104 may be situated within the building 100 where the sensors are located or may be situated elsewhere, for example at a data center. The controller 104 or one or more functional elements of the controller (e.g. any of the event detection engine 108, comparison engine 110, analysis engine 112 and filtering engine 113) may alternatively be co-located with or integrated with a sensor or sensing unit. Where the functional elements are distributed between a number of sensing units, there may be no central controller as such and the sensors may share the sensor data among themselves. A non-exhaustive list of examples of appropriate types of controller is; Programmable Logic Controllers (PLCs), System/Network controllers, and Terminal Unit controllers. In an embodiment, the controller 104 may be implemented on a server which may be located in the building 100 or elsewhere (e.g. this may be a home server where the building 100 is a residential property).

The controller 104 further comprises at least one output which may be used to output the generated metadata or to communicate with further device 106. In an example, the system shown in FIG. 1 may comprise a temperature control system for the building 100 and the further device 106 may comprise a thermostatic radiator valve or air conditioning unit. In another example, the system shown in FIG. 1 may comprise an alarm system for the building 100 and the further device 106 may comprise an alarm bell or buzzer. In other examples the sensor system may be in control of a plurality of different aspects of a building control system. In any of these examples, the controller 104 transmits control signals to the further device 106 based on the generated metadata and in some cases, also based on current sensor data.

Where the controller 104 communicates with a further device 106, this communication may be direct (as shown in FIG. 1) or via another device. In an example, signals for the further device 106 may be sent via a sensor or sensing unit, e.g. one which is located closer to the further device 106 than the controller 104. For example, where the further device 106 is a thermostatic radiator valve or air-conditioning unit in a room, the control signal for that device may be sent by the controller 104 to a sensor 102 (or sensing unit) within the same portion of the building and the control signal may then be passed onto the further device 106 by the sensor or sensing unit.

The event detection engine 108 monitors data from the plurality of sensors in order to detect changes in that data, which are referred to as 'events'. The detected events may suggest a change in conditions in one or more portions of the building (e.g. a light being switched on or a person entering the portion of the building). The detected events are time-stamped, i.e. each event has associated with it, the time at which the event occurred and this time information is used by the comparison engine 110, as described below. The nature of the change which is detected and the method of change detection may be dependent upon the type of sensor and the nature of the sensor data. In an example, the event detection engine 108 may comprise a classifier adapted to identify significant events in a single data trace, such as the start and end of periods of detected motion or a step change in a detected value or in a short term average of a detected value. Methods of event detection are described in more detail below with reference to FIGS. 2 and 4-7.

The comparison engine 110 compares events identified in data streams from at least two sensors to find correlated events, i.e. events identified in data streams from different sensors which occur within a specified time period of each other (and so can be considered time-synchronized) and therefore may be related. The time period may be fixed or variable and there may be other factors used in identifying correlated events, such as the nature of the change in sensor data (e.g. where the change was in the same or opposite directions, where the sensor data has a similar profile; however, the events do not need to be of the same amplitude). Examples of event comparison are described in more detail below with reference to FIGS. 2 and 4-9. Where correlated events are identified in data streams from two or more sensors, a link between the sensor locations can be inferred and data representative of a possible link (or transition) between the sensors is created. In an example, this data may comprise an edge in a graph where the each node in the graph corresponds to a sensor or to a portion of a building containing a sensor.

The analysis engine 112 automatically generates the metadata, such as a representation of the building layout, based on the link data generated by the comparison engine 110. In some examples, a filtering engine 113 may optionally be used to filter the link data in order to filter out links which may be false positives. This filtering operation is described in more detail below. As described above, the metadata may include: the size of the room, which rooms are adjacent to one another, the distance of the rooms from one another, which way the windows face, which floor of the building the room is on, etc. In an example, the analysis engine may output an auto-generated floor plan of the building in which the sensor network is located. In another example an initial floor plan may be provided to the system and the inferred metadata can be used to update the floor plan, for example with more detail, the positions of the sensors etc. In another example the analysis engine 112 may be used to construct a model that can be used in an aspect of the building control, e.g. a thermal model of the building or a model of building use.

Figure 2:
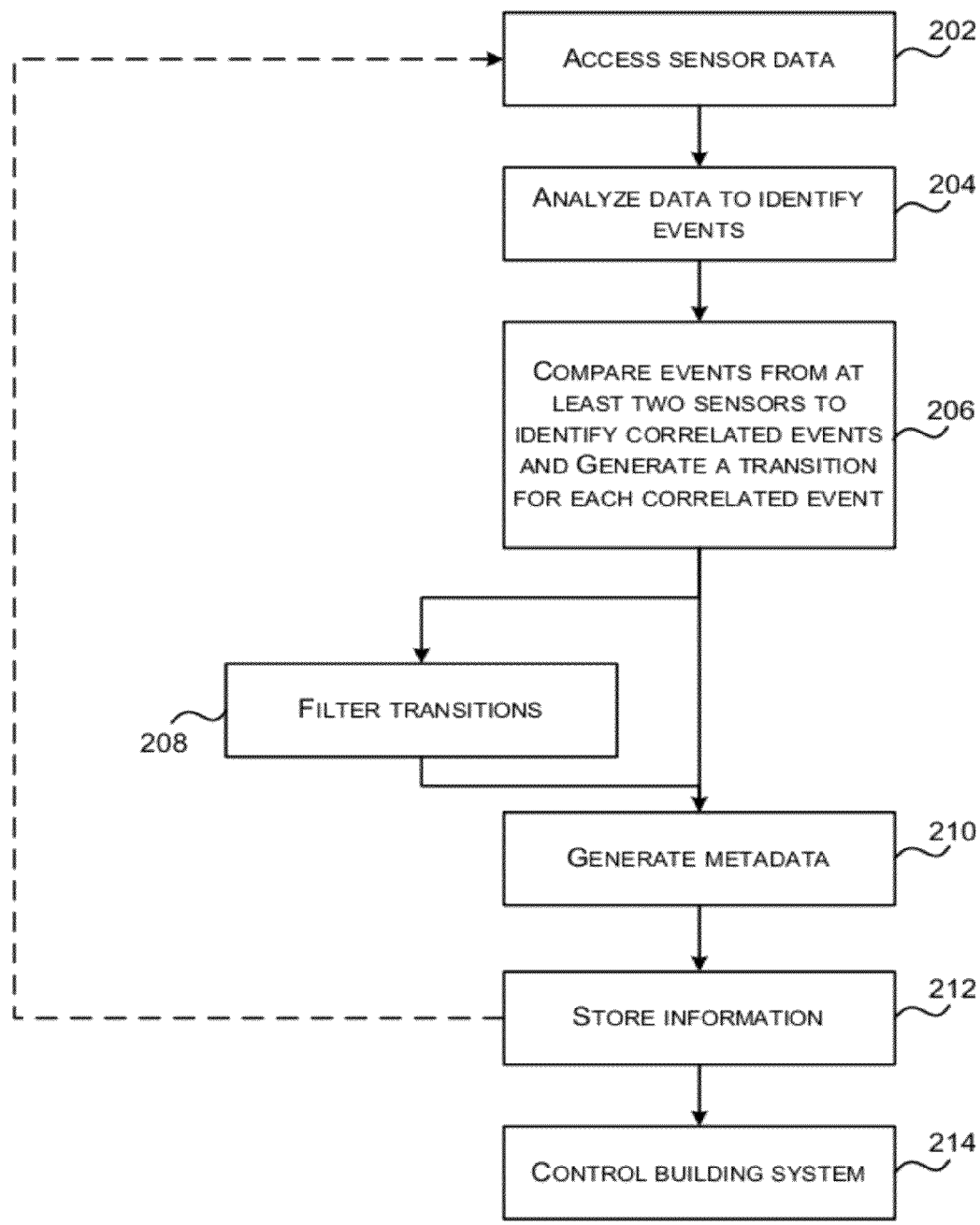
FIG. 2 is a flow diagram of an example method of inferring metadata from distributed sensors.

An example method of using a distributed sensor network, such as shown in FIG. 1, to automatically infer the metadata is described with reference to FIG. 2. This method may be implemented by the controller 104 in FIG. 1. Sensor data from one of a plurality of distributed sensors is accessed (block 202), where each sensor is located in a portion of a building. The sensor data may be accessed (in block 202) from a data store (e.g. data store 114 in FIG. 1) or may be received from the sensors (e.g. by the controller 104 in FIG. 1). The sensor data is analyzed (block 204, e.g. by event detection engine 108) to identify events indicated by a change in the sensor data from a particular sensor. As described above, the nature of the change that is detected and the algorithm used to detect the change may depend on the nature of the sensor data and different examples are described below.

Having identified events (in block 204), events in sensor data from at least two of the plurality of distributed sensors are compared (in block 206) to identify correlated events (e.g. using comparison engine 110). As described above, the identification of correlated events is based on the time-stamp of an event and may also be based on other parameters stored about a detected event and the particular parameters used may depend on the types of sensors used (e.g. frequency may be used where the sensors are microphones). In the examples below, events in sensor data from different sensors of the same type are compared; however in other examples sensor data from different types of sensors may be compared where the sensors detect the same real-world event or underlying physical change (e.g. a PIR sensor in one room may detect movement and a camera in another room may also detect movement).

The comparison (in block 206) may, in some situations, occur offline, for example in applications where inferring the metadata is not time critical. This may be the case in variants of control systems where there is only a limited amount of processing available for the sensor data or processing can only be done on a periodic basis, for example, in embodiments where the control functions are distributed across the sensor network. In other variants the comparison may occur online and the metadata can be derived in real time.

Where a correlated event is identified (in block 206), data representing a link (or transition) between corresponding sensors is stored. This data representing links between sensors (as stored in block 206) may then be used to generate the metadata (in block 210, e.g. using analysis engine 112) or the link (or transition) data may first be filtered (in block 208, e.g. using filtering engine 113) to reduce or eliminate incorrectly correlated events (referred to as false positives) and this filtering process is described in more detail below.

Figure 3:
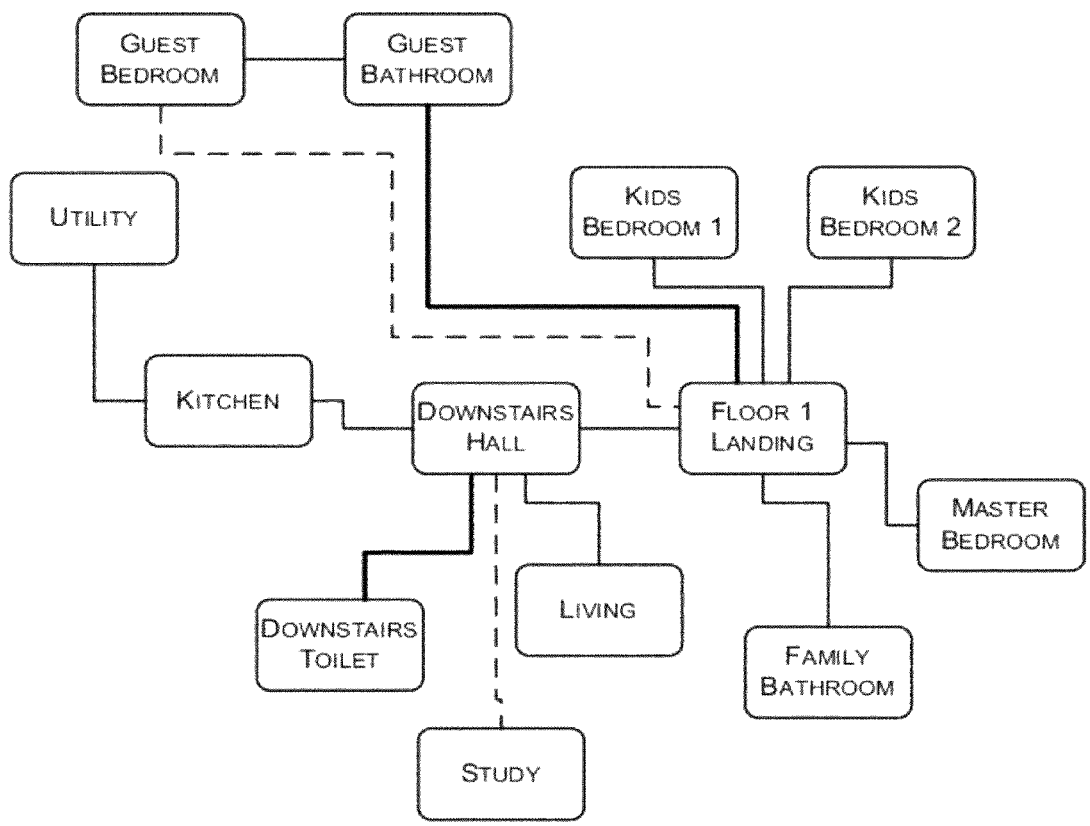
FIG. 3 shows an example of a room connectivity graph.

The metadata is automatically generated (in block 210) by recording that where there is a transition between building sensors, e.g. sensor 1 and sensor 2, there is a physical link between the building portions in which the sensors are located (e.g. building portion 1 and building portion 2). Where the metadata comprises a room adjacency (or room connectivity) graph, a connection between rooms may be recorded by connecting components which represent each room according to rank (i.e. the number of transitions between two rooms) until the graph is connected and an example of such a graph is shown in FIG. 3. Where the metadata comprises an auto-generated floor plan, a first area corresponding to building portion 1 is drawn adjacent to a second area corresponding to building portion 2 and an opening (e.g. a doorway) may be shown between the two areas. Further details of the building layout, such as room orientation, may also be inferred from the identified correlated events or from the sensor data itself and this is described in more detail below.

Having generated the metadata (in block 210), this information may be stored (block 212, e.g. in data store 114). Where the sensor data (accessed in block 202) is not accessed from a data store, this data may also be stored (e.g. in block 212). The stored metadata may subsequently be used in the control of a building system (block 214, e.g. by sending signals to a further device 106, as shown in FIG. 1), such as a temperature control system or alarm system and these applications are described in more detail below. The building control may be based on metadata comprising a representation of the physical relationship between building portions or on a combination of the representation and recent sensor data. In an example, the system (in block 214) may selectively turn the heating on prior to the building being occupied where the metadata comprises room use patterns. In another example a control signal may switch off the lights if no movement has been detected for a period of time and the room use patterns predict that no occupants are likely to return within a specified time frame.

Detection of Room Connectivity Using Light Sensors

Room connectivity can be detected using light sensors because light from one room spills over to nearby rooms and in particular by detecting a large jump in light intensity in one room which is time-synchronized with smaller changes in other rooms. The large jump corresponds to a light being switched on or off in the room and the time-synchronized smaller changes correspond to the spill over into neighboring rooms.

Figure 4:
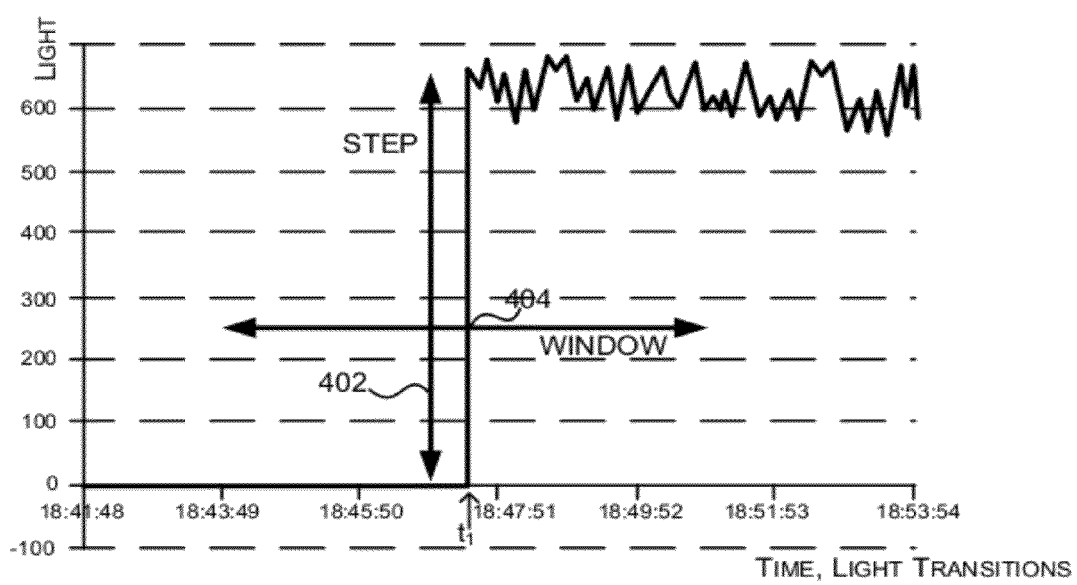
FIGS. 4 and 5 show graphs of light intensity against time, as detected by light sensors.

FIG. 4 shows a graph of light intensity, as detected by a light sensor in a particular room, against time. An event may be detected in this sensor data where a step change in the data is detected which exceeds a defined threshold. The step change may be defined in absolute or relative terms and in an example, the following algorithm may be used for event detection:

If STEP/AVG$_{WINDOW}$(STEP)>THRESHOLD, mark a light event

In this example, the magnitude of the step (indicated by arrow 402) is divided by the average light value over a time window which contains the step (indicated by arrow 404). In the example shown, an event is therefore detected at time $t_1$. In another example, the following algorithm may be used:

If HEIGHT/VARIATION>THRESHOLD, mark a light event where:

$$HEIGHT = |light(k+1) - light(k)|$$

$$VARIATION = \frac{1}{WIN} * \sum_{i=-\frac{WIN}{2}}^{\frac{WIN}{2}} |light(k+i+1) - light(k+i)|$$

In other examples, other algorithms may alternatively be used, e.g. $|s(t+\Delta t)-s(t)|>T$, where $s(t)$ is the sensor data value at time t (or a short term average of that value around time t) and T is a predefined threshold.

Figure 5:
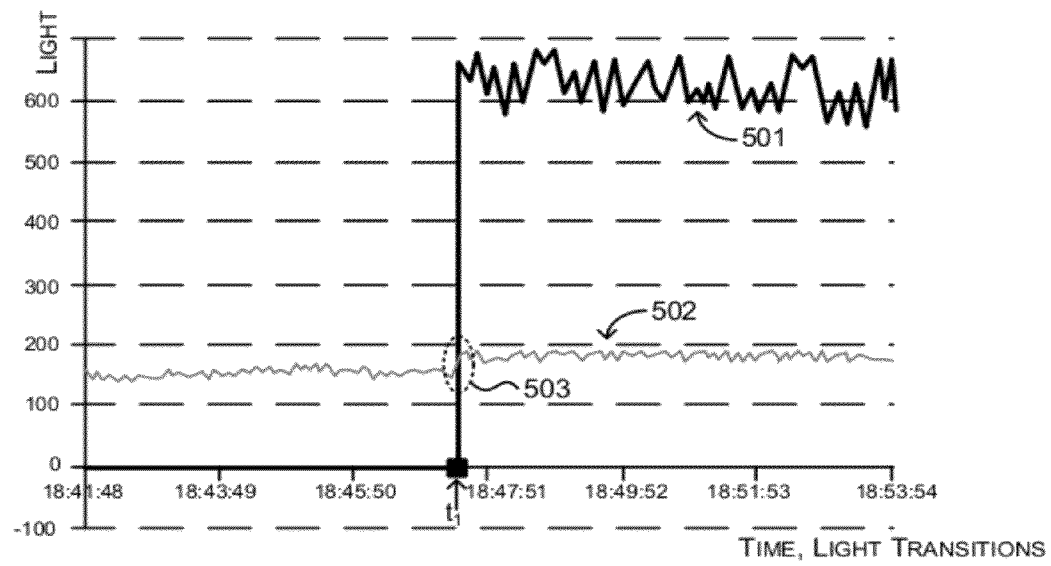

FIG. 5 shows a second graph of light intensity which includes the sensor data 501 from a first room, as shown in FIG. 4, and the sensor data 502 from another room. This second set of sensor data 502 also includes a step 503 and again the algorithm described above may be used to determine if this step triggers detection of a light event, which in this case would also be at time $t_1$.

In addition to recording the time of the light events detected (e.g. $t_1$ for both the events shown in FIGS. 4 and 5), other parameters may also be recorded, such as an event type (e.g. light event or whether the step is a rising or falling edge) or the amplitude of the change and this information may be used in determining (in block 206) whether the events are correlated and therefore whether a transition between rooms should be generated. In an example, a transition may be generated where the light events occur at the same time (or within a small time window to take into consideration any differences between clocks) and where:

LARGER_STEP/SMALLER_STEP>THRESHOLD where LARGER_STEP and SMALLER_STEP are the sizes of the steps corresponding to each detected event.

Although this example shows the correlation of events in data from two light sensors, it will be appreciated that the methods described may be applied to data from more than two sensors and this may be particularly relevant where the light being turned on or off is in a hall or landing which may have many adjacent rooms in which sensors are located which detect the change in light over spill.

There may be other considerations which are also taken into consideration when determining room connectivity based on light sensors and one example is that events may be limited to those that occur at night time (e.g. after dark) so as to restrict events to only those which are caused by switching on/off of artificial lighting and in such an example an external sensor (outside the building) may be used to determine the external (natural) light level. Another example is where large step changes are detected at substantially the same time in sensor data from multiple sensors and in this case it may not be possible to perform such correlation unless it is known (e.g. from correlation of every detected event between the sensors) that all the sensors exhibiting the large step change in light intensity are located within the same room.

Light sensors are not the only type of sensors which may be used to detect over spill from one room to another. In other examples, data from microphones may be used to detect over spill of noise, humidity sensors may be used to detect over spill of moist air from a bathroom or data from temperature sensors may be used to detect heat transfer from one room to another (although this will be a much slower effect than the substantially instantaneous effect using sound or light).

Detection of Room Connectivity Using Motion Sensors

Room connectivity can be detected using motion sensors by exploiting peoples normal movements between rooms and this motion may be detected on adjacent sensors.

Figure 6:
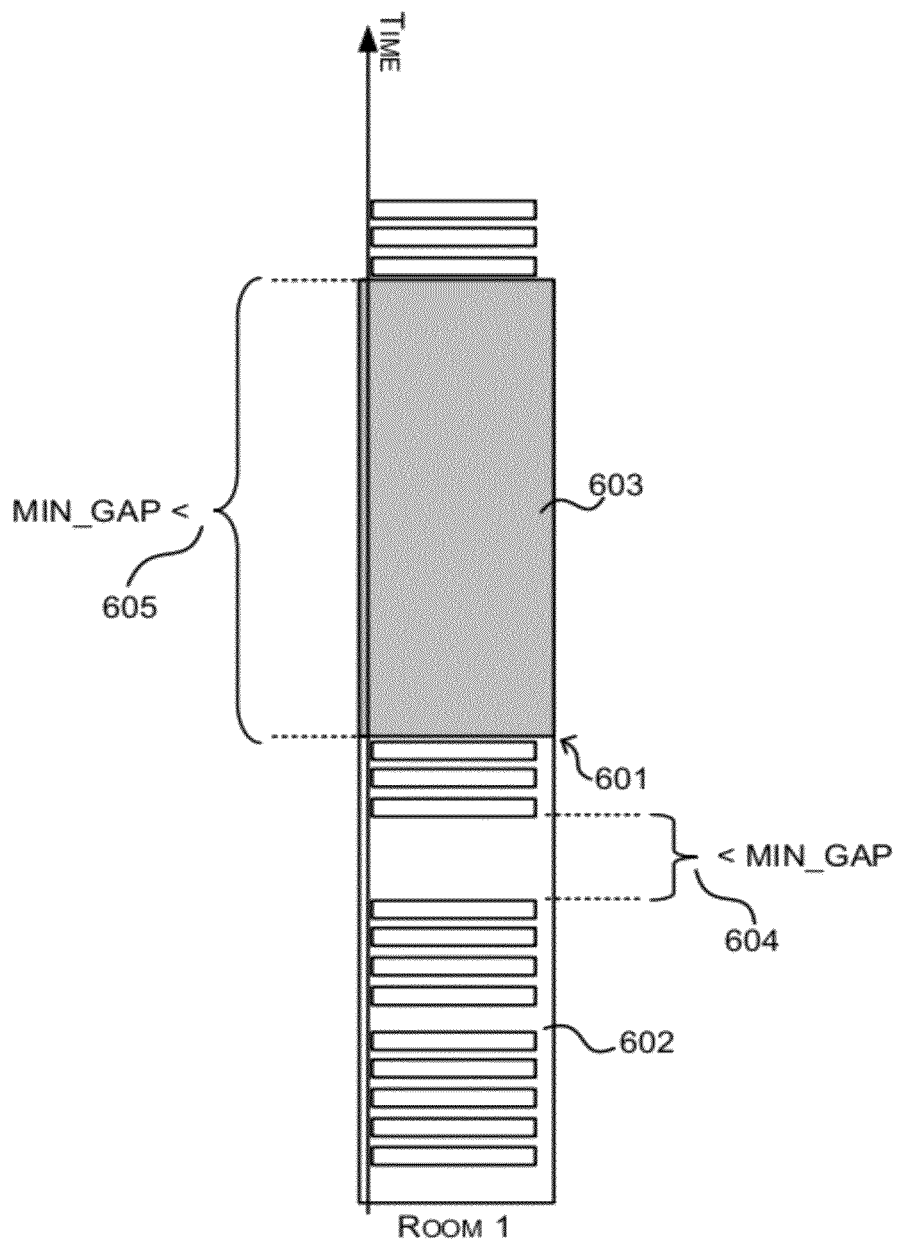
FIGS. 6-9 show graphs of motion data against time, as detected by motion sensors.

FIG. 6 shows the sensor data from a first motion sensor against time. Events may be detected (in block 204) where periods of motion stop and start. However, as motion will not be detected if a person does not move, whilst still remaining in the room, a parameter MIN_GAP may be used to define the movement and static blocks and events may be detected at the boundary 601 between a movement block 602 and a static block 603. Where there is a gap 604 in the detected motion which is less than MIN_GAP, this does not constitute a boundary between a movement block and a static block as this is assumed to correspond to a person pausing within the room. However, if the gap 605 in the detected motion exceeds MIN_GAP, this period of no motion does constitute a static block (it is assumed that the person has left the room) and an event is marked at the boundary 601 between blocks. As in the earlier example, in addition to recording the time of the motion events detected, other parameters may also be recorded such as whether the event is a start of motion event (e.g. a transition from a static block to a movement block) or an end of motion event (e.g. a transition from a movement block to a static block, as at boundary 601).

Figure 7:
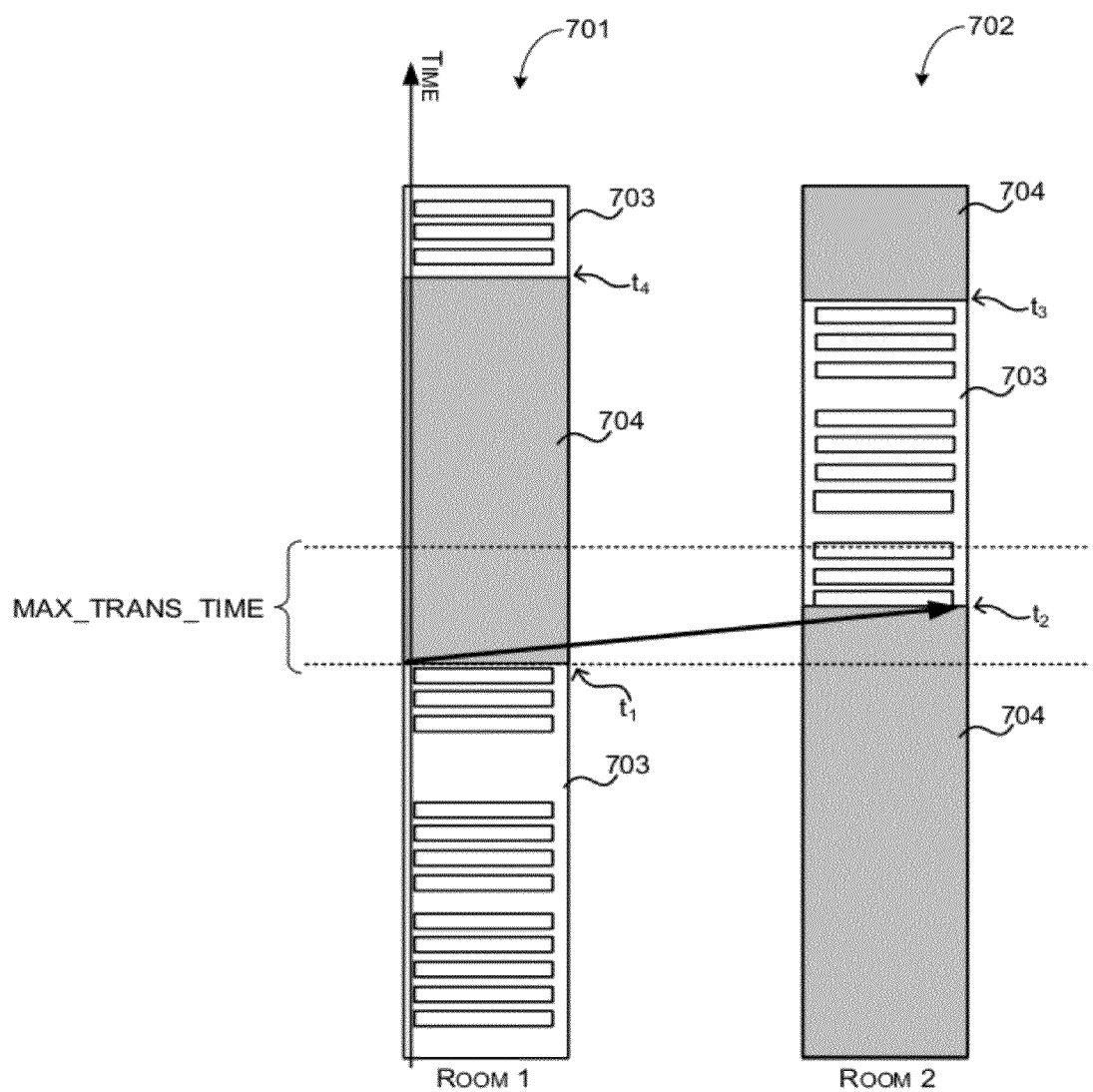

FIG. 7 shows the sensor data from two motion sensors 701, 702 located in different rooms and in each data stream, events may be detected at the boundaries between movement blocks 703 and static blocks 704. In this example, four events may be detected (two in each data stream) at times $t_1$-$t_4$. Two events may be considered time-synchronized if they occur within a defined time window, MAX_TRANS_TIME and in an example, this parameter may be set at 5 seconds. The events may be identified as correlated (in block 206) if they are time-synchronized and if one event corresponds to a start of motion event and the other event corresponds to an end of motion event. In the example shown in FIG. 7, the events at times $t_1$ and $t_2$ are correlated and the events at times $t_3$ and $t_4$ are correlated.

Figure 8:
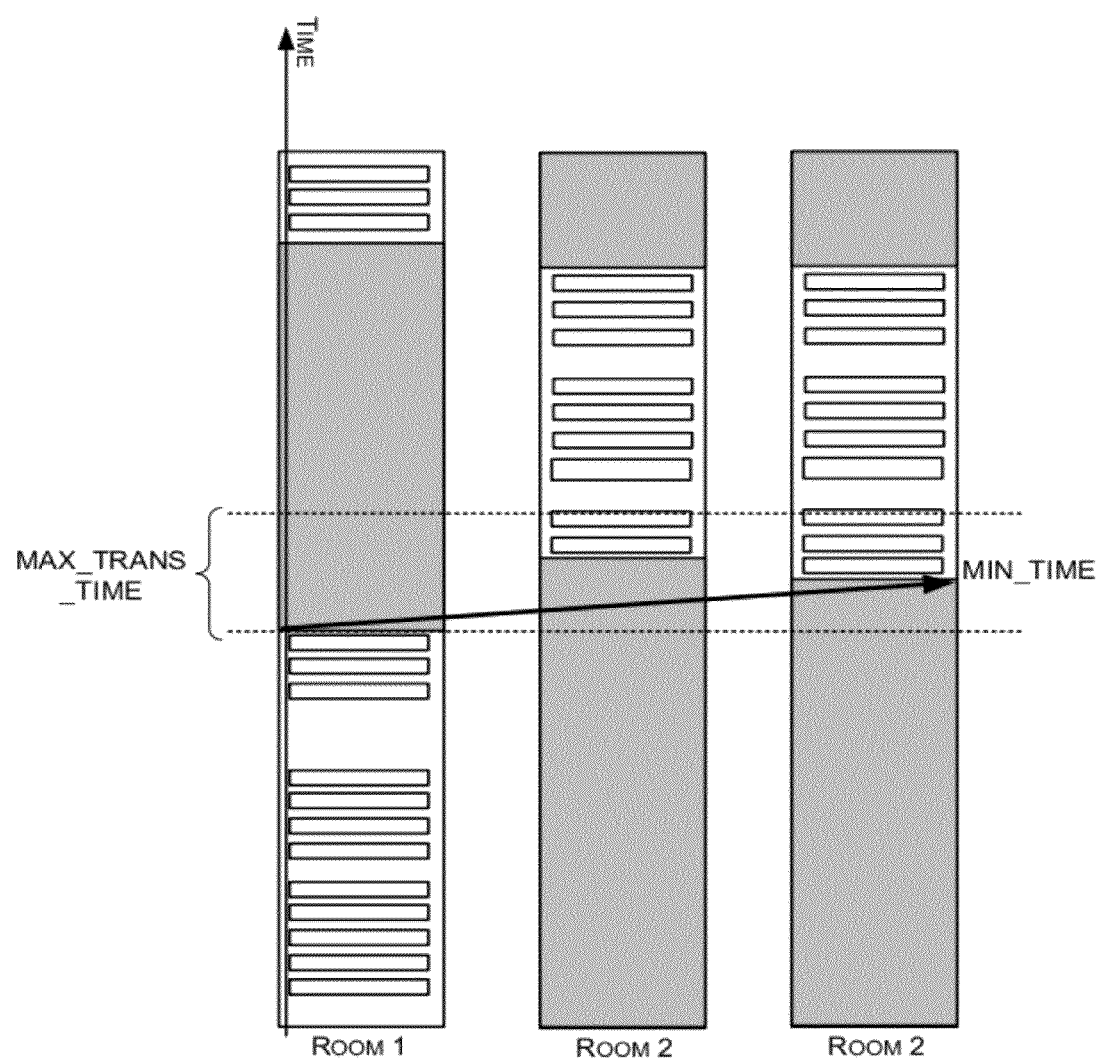
Figure 9:
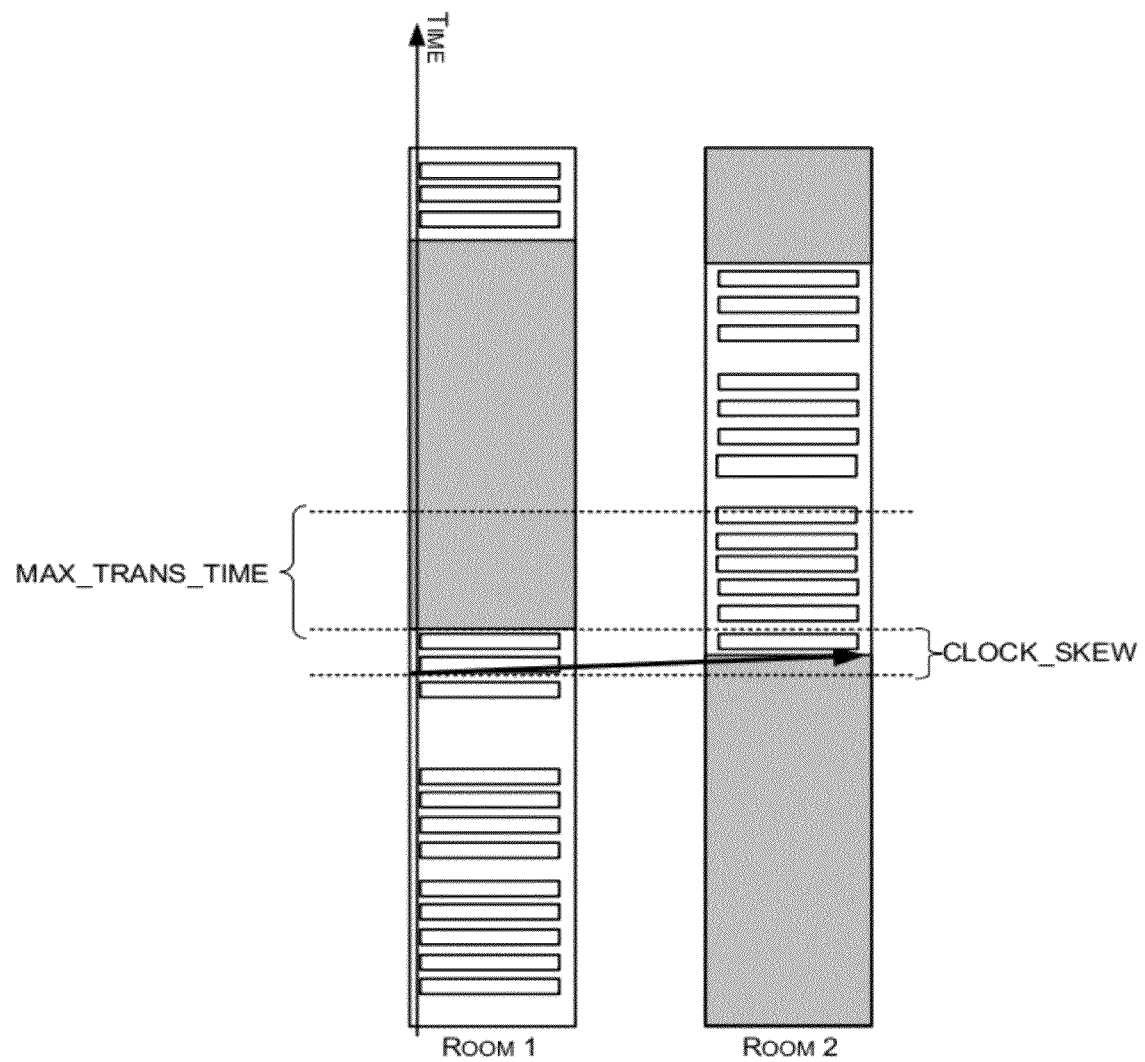

If the value of the defined time window (MAX_TRANS_TIME) is set to too small a value, transitions may be missed and if it is set to too large a value it is susceptible detection of false positives (i.e. events which are identified as correlated but do not correspond to a real transition from one room to another). The value of this parameter may therefore be tailored to the particular arrangement of sensors and rooms in a building. In order to improve the accuracy of room connectivity as detected using motion sensors, one or more additional parameters (in addition to MAX_TRANS_TIME and where used, MIN_GAP) may also be used in determining whether events are correlated. As shown in FIG. 8, a minimum transition time (MIN_TIME) may be defined to avoid detection of a correlation of events which are actually caused by the motion of different people. This parameter may be set to a small value which is at (or lower than) the minimum possible time taken to transition from one room to another. A parameter CLOCK_SKEW (as shown in FIG. 9) to allow for clocks to drift between the different sensors.

Detection of Room Orientation Using Light Sensors

Figure 10:
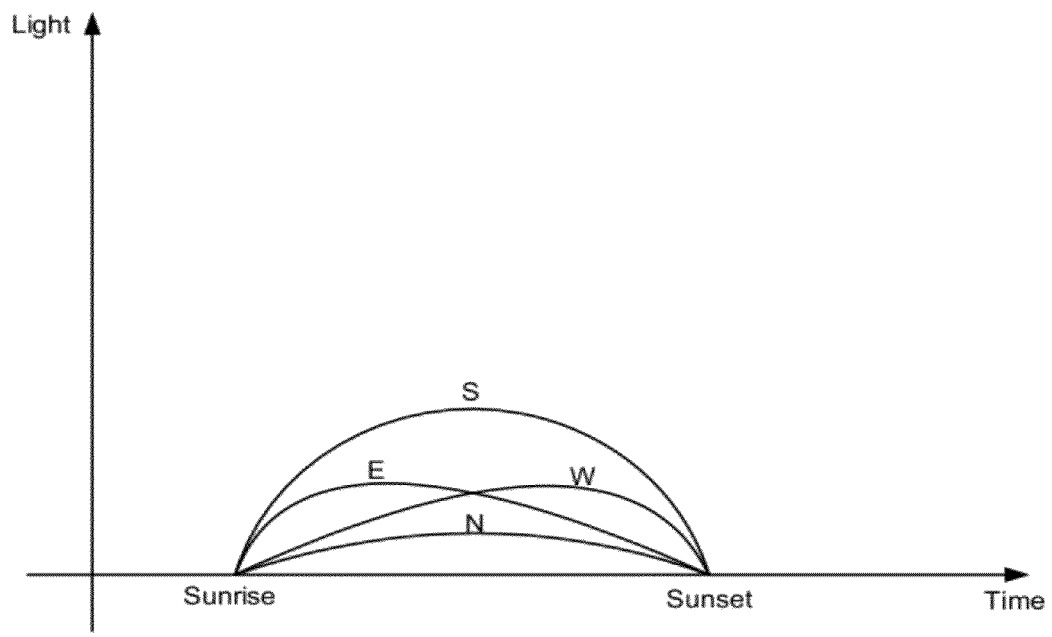
FIG. 10 shows a graph of the expected light levels for a room based on the orientation of the room.

As described above, in addition to using the correlated event data to infer the metadata, the sensor data from individual sensors may also be used (e.g. by analysis engine 112) to provide more information within the metadata. In an example information from ambient light sensors may be compared in order to infer the orientation of a room (i.e. the direction of the windows in the portion of the building a sensor is located in). FIG. 10 shows a graph of the expected light levels for a room based on the orientation of the room, for example, a sensor which observes a rise in ambient light levels in the morning which then tails off in the afternoon may be assumed to be in a portion of the building with east facing windows. A sensor which observes a more prolonged rise in light levels with a peak in the signal around midday may be taken to be in a portion of the building with south facing windows. A sensor which observes only a small rise in light levels may be in a north facing portion of the building.

Figure 11:
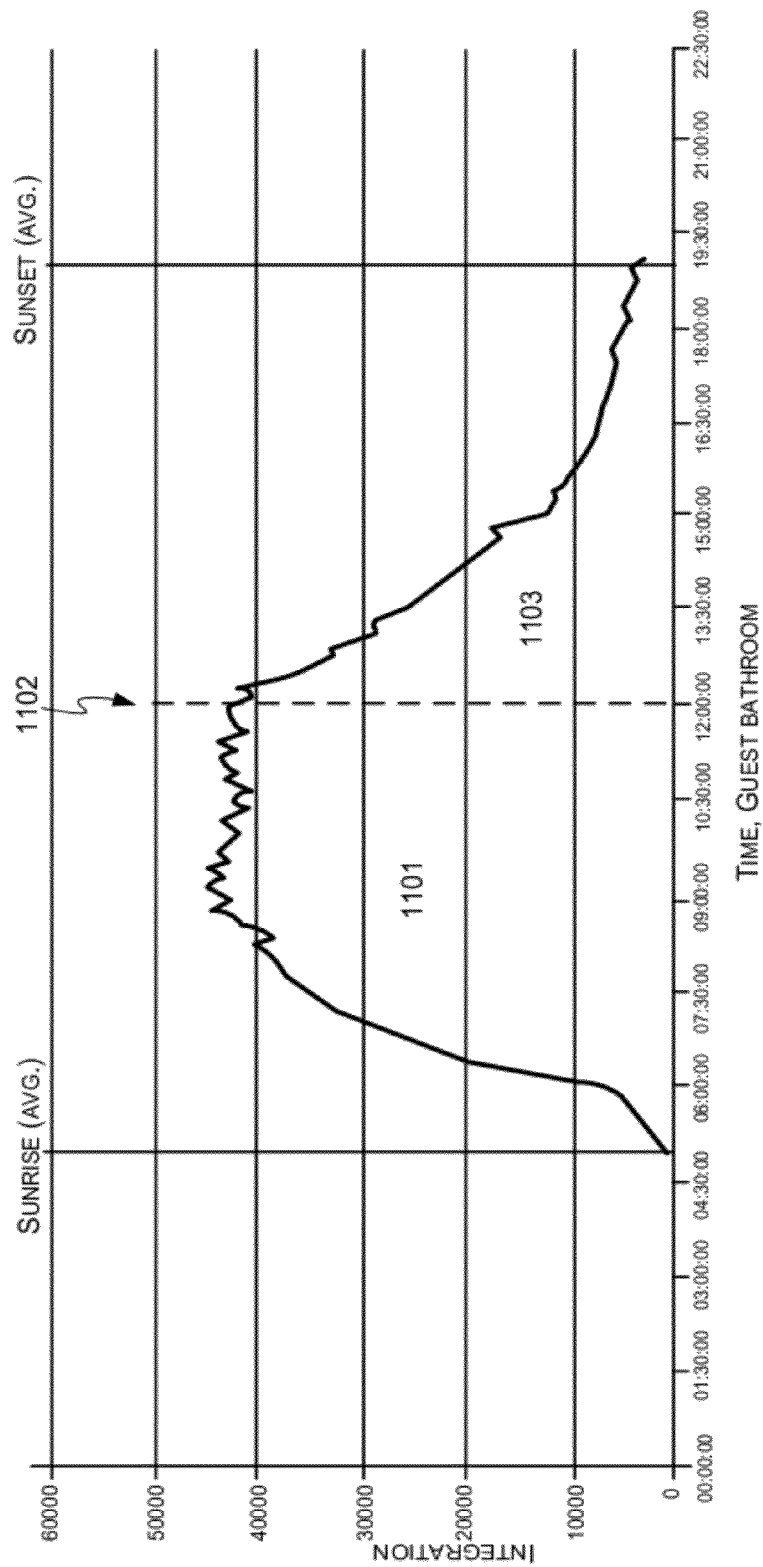
FIG. 11 shows a graph of light intensity by time of day integrated over a whole month.

Light intensity is, however, affected by curtains (or other window coverings), window size and artificial lights and a building may not be north/south/east/west oriented and so such basic analysis is inaccurate. Instead, light intensity data may be integrated over a whole month (or other time period) and the shape of the light graph over the whole day analyzed to distinguish whether a room is east or west facing. Determination of whether a room is east/west facing may be useful in heating applications because the solar heating effect in a room will depend on the time of day. FIG. 11 shows light intensity by time of day integrated over a whole month and the classification may be performed using the following algorithm:

LEFT_AREA/RIGHT_AREA>1, classify as East facing
LEFT_AREA/RIGHT_AREA<1, classify as West facing where LEFT_AREA is the area 1101 under the curve before midday (marked by dotted line 1102) and RIGHT_AREA is the area 1103 under the curve after midday. Experimental results have shown that this algorithm correctly classified 17 out of 24 rooms across two buildings, with 6 rooms not classified.

In addition to, or instead of, integrating the data over a month an external light sensor (i.e. one located outside of the building) may be used to normalize the in-room light sensor data. Such an external sensor may also be used when determining connectivity based on light sensor data, e.g. to determine the times of day when the changes detected are due to artificial light sources and hence the sensor data can be used to detect light over spill between rooms.

Other Analysis Based on Event or Sensor Data

There are other techniques which may be used to provide additional information within the metadata and in an example, data from temperature sensors may be compared and from the comparison it may be inferred that building portions (or linked groups of building portions) having, on average, a lower temperature, are on a lower floor than building portions having, on average, a higher temperature.

In another example, by measuring the time period $t_2-t_1$ between two correlated motion events (as shown in FIG. 7) it may be possible to infer how far apart the sensors are located from one another and hence gain an indication of size of rooms. In another example the amplitude of the signal may be used to determine how far away the movement is from the sensor and therefore place limits on the size of the room or building portion in which the sensor is located.

In a further example, data from sensors may be used to infer room type. For example, rooms which have a high humidity for short periods of time may be bathrooms and the data from a humidity sensor may further be used to detect when the rooms are in use (e.g. bath being filled, shower on) and to intelligently predict requirements for hot water within the building.

Temperature and/or humidity sensor data may be used to detect when windows are opened (particularly in a bathroom) and to sound an alarm after a defined period or when the temperature/humidity dropped to a particular value or by a particular amount. Air pressure sensors may alternatively be used to detect the opening/closing of windows/doors.

Filtering the Transition Data

As described above, the transition data (generated in block 206) may optionally be filtered (in block 208, e.g. using filtering engine 113), for example by applying one or more thresholds, so that individual false positives (i.e. incorrect identification of a correlation between events) do not affect the generated metadata (in block 210). An example of a false positive can be described with reference to detection of motion data. In an example, the detected event data suggests that a building occupant has exited one room and entered another room. However, particularly where there are multiple occupants in a building it is possible that the correlation between the two events is not a true correlation but is incidental, for example a first occupant exits a first room and a second occupant almost simultaneously enters a second room (which may not be adjacent to the first room). The data which is filtered out is excluded from use in the analysis (in block 210) and may be deleted or flagged to mark it as less important.

By observing many events it can be determined which events are most likely to be truly correlated by applying a threshold condition, which may be a ratio. The level of the threshold may be set automatically or specified by a user or administrator of the system. The filtering need not be completely accurate; a small number of falsely correlated events where the resulting transition is not removed by filtering or missed correlated events where real transitions are removed may not affect the overall metadata if the number of occurrences in comparison to real correlated events is low.

In an example, the filtering may involve a threshold such that where the number of transitions generated between a particular pair of rooms is below a threshold, A ⇆B>THRESHOLD then all transitions between the pair of rooms are filtered out (in block 208) and not used in generating the metadata (in block 210). However, such a filtering method may not be effective in eliminating false positives in some circumstances, e.g. where the transitions are generated based on motion data and some rooms are more occupied than others, because these heavily occupied rooms have more false positives associated with them.

In another example, ratios may be used in performing the filtering and depending upon the sensor data used, the ratios may take into consideration the direction of transitions between rooms (e.g. where the sensor data is motion data, the direction of transitions between independent spaces can be inferred). In an example using directional transitions, there are a number of different ratios which may be used:

$$\frac{A \to B}{A \to *}, \frac{A \to B}{* \to B}, \frac{B \to A}{B \to *}, \frac{B \to A}{* \to A}$$

where A→B is the number of transitions generated from room A to room B, A→* is the number of transitions generated which start in room A and end in any room, *→A is the number of transitions generated which end in room A and start in any room, etc.

In an example, any of these ratios may be computed and if a ratio exceeds a predefined value (which may be different depending on the ratio used) then the connection between rooms is assumed to be real and if the ratio does not meet the threshold then it is more likely that the transition is a false correlation. In some examples, two or more ratios may be computed such that according to the way the system is configured, at least one of the threshold conditions or all conditions (for those ratios computed) must be satisfied in order for the correlated event to be considered a real correlation and such that the corresponding connection between rooms A and B is not filtered out. Experimental results using a combination of ratios to filter motion data have identified 9 true positive connections between room, 5 false negatives, 77 true negatives and no false positives, which demonstrate the capability of this filtering technique.

Although the filtering examples described above use examples where there is a directionality associated with a transition (e.g. A→B is different from B→A), in other examples the transitions may not be directional (e.g. where the correlated events are generated from light sensor data such as shown in FIGS. 4 and 5). In this case ratios may still be used, where examples of suitable ratios include the number of transitions between a first sensor, A, and a second sensor, B, divided by the total of transitions involving either the first sensor or the second sensor, e.g.

$$\frac{A-B}{B-*} \text{ or } \frac{A-B}{A-*}$$

where the order specified is not relevant.

Another Example Method

Figure 12:
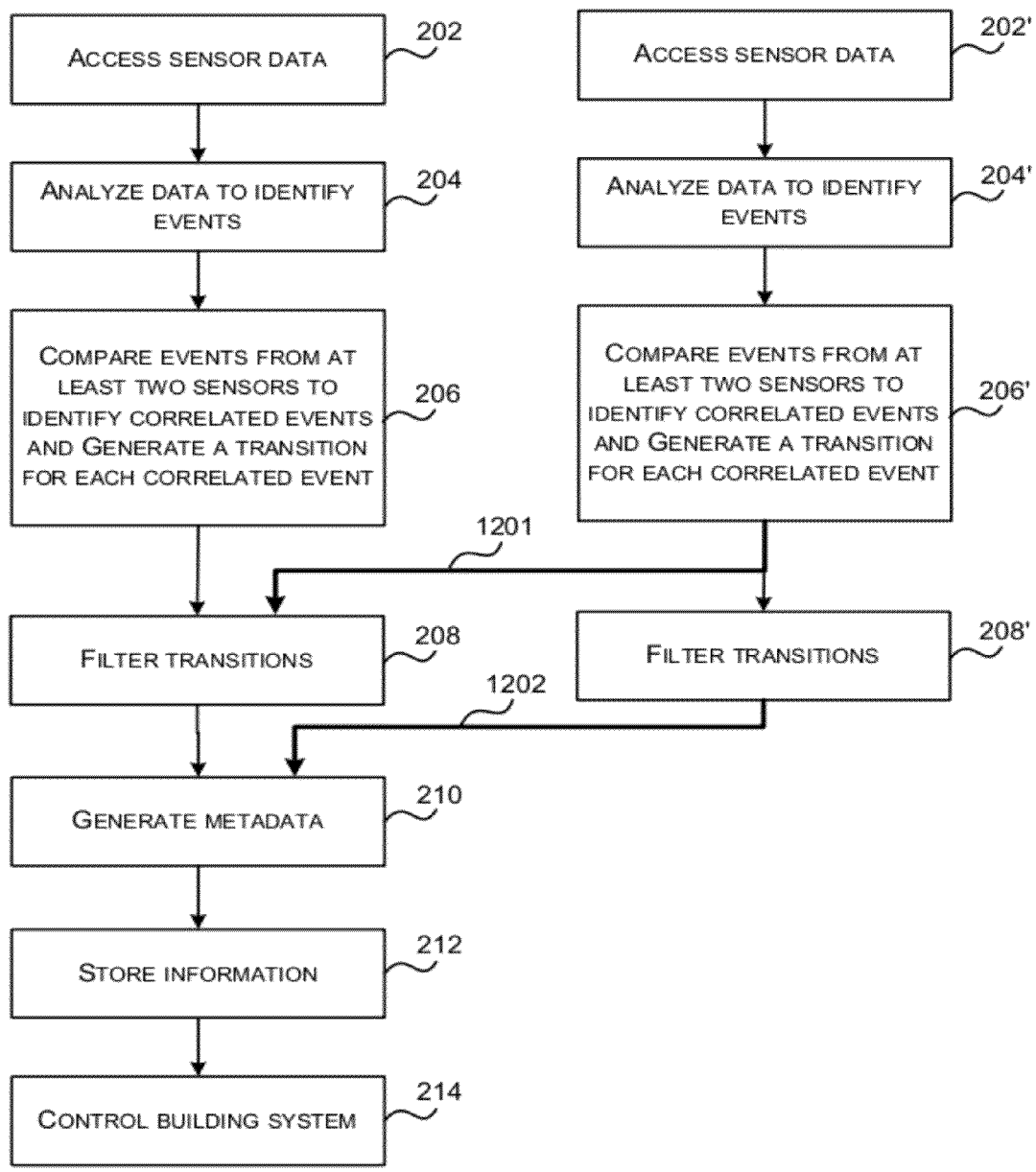
FIG. 12 is a flow diagram of further examples of methods of using a distributed sensor network to automatically infer building metadata.

The method described above with reference to FIG. 2 uses sensor data from a plurality of sensors which are of a single type (e.g. PIR sensors) or which detect a single physical change (e.g. motion) to generate the metadata. By combining correlated events or transition information generated from sensor data from a plurality of different kinds of sensor, the accuracy of the metadata may, however, be improved. FIG. 12 shows examples of how data from two different sets of sensors (as accessed in blocks 202 and 202') can be combined and these two sets of sensors may, for example, comprise a plurality of PIR sensors (with the data being processed in blocks 202-208) and a plurality of light sensors (with the data being processed in blocks 202'-208'). In the first example, the link data (as generated in blocks 206 and 206') is combined (as indicated by arrow 1201) prior to filtering (in block 208) and in the second example, the filtered link data is combined (as indicated by arrow 1202) prior to generation of the metadata (in block 210, e.g. by the analysis engine 112). Where filtering is not used, the unfiltered link data may be combined prior to generation of metadata (in block 210).

A Room Controller

Figure 13:
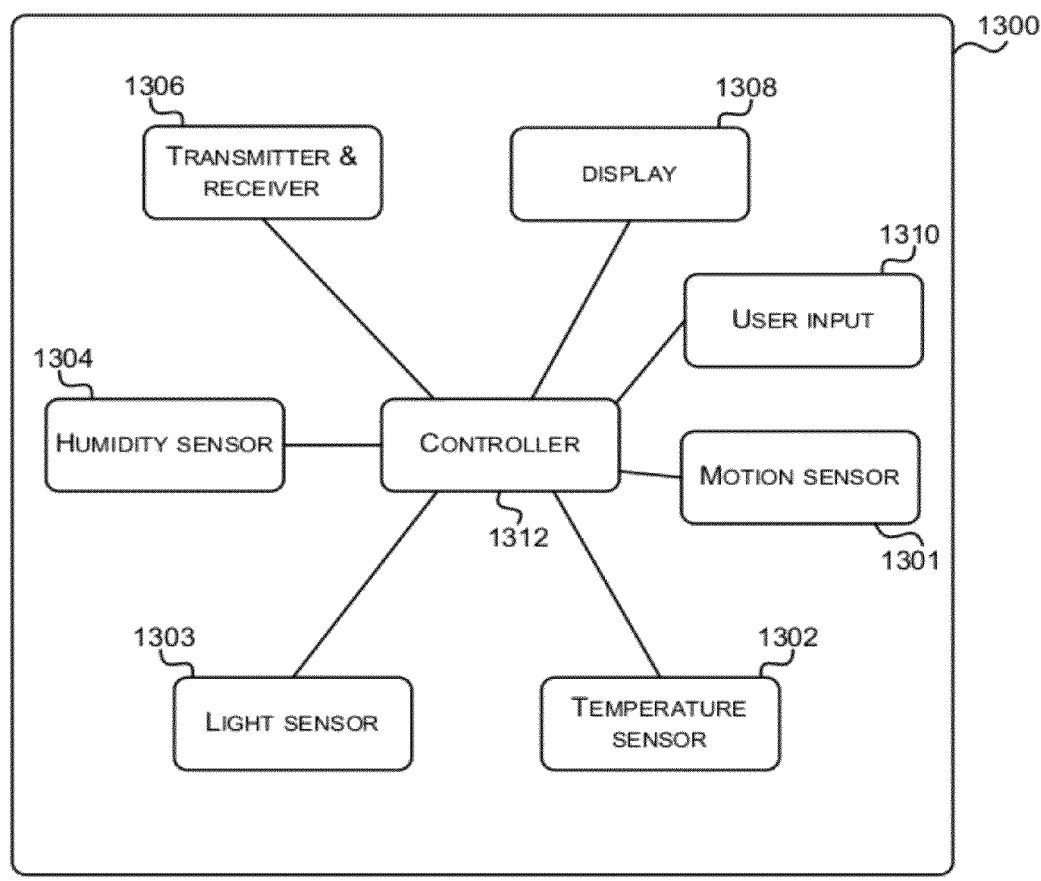
FIG. 13 is a schematic diagram of a room controller.

As described above, sensors 102 of different types may be integrated within a single sensing unit. In some examples, this unit may be referred to as a 'room controller' where it comprises some control functionality, as shown in the schematic diagram in FIG. 13. The room controller 1300 is distinct from the controller 104 shown in FIG. 1, which may be referred to as a central controller for purposes of distinguishing the two units in the following description. The room controller 1300 comprises a plurality of sensors 1301-1304, in this example, a motion sensor 1301, a temperature sensor 1302, a light sensor 1303 and a humidity sensor 1304. The room controller also comprises a transmitter and receiver unit 1306 which enables the room controller to send sensor data to the central controller 104, to receive control instructions from the central controller and to send control signals to other devices (e.g. further device 106 in FIG. 1), such as air conditioning units, radiator valves, alarms etc, dependent upon the application for which the room controller and the system is being used. These control signals may be sent to such another device either directly (e.g. through a relay), wirelessly (e.g. through radio control using the transmitter and receiver unit 1306) or via the home server (e.g. if the heating control is in a separate "zone" of the house, again using the transmitter and receiver unit 1306). The room controller 1300 may also comprise a display 1308 (e.g. for displaying some of the measured parameters, such as the temperature of the room) and/or a user input means 1310, such as a button, to enable a user to override the central control (e.g. to manually activate an alarm or to manually switch on or off the heating within the room).

In an example, the room controller 1300 collects sensor data using sensors 1301-1304 and then transmits this to the central controller using the transmitter and receiver unit 1306. In response, the room controller receives a schedule of operation from the central controller (again via the transmitter and receiver unit 1306), which is implemented by the controller 1312 within the room controller 1300. In an example, the schedule may specify a temperature profile for the room in which the room controller is located and the room controller may implement this profile by detecting the instant temperature (using temperature sensor 1302) and sending signals to heating/cooling systems within the room (using transmitter and receiver unit 1306) as required.

Sensor Relocation

Figure 14:
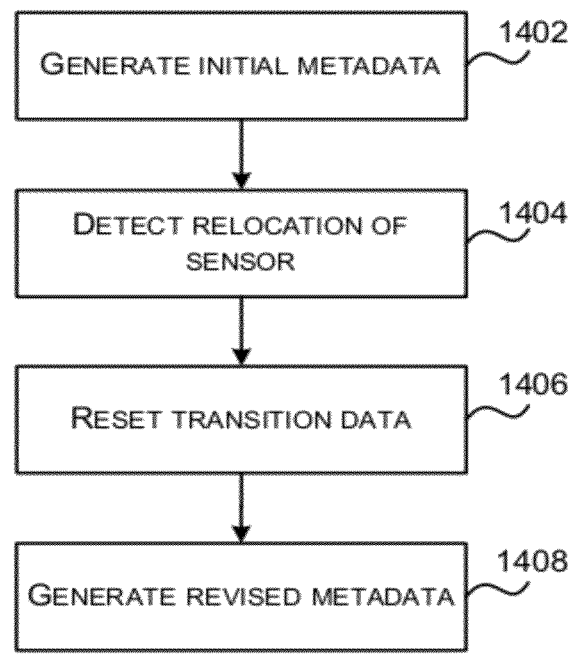
FIG. 14 is a flow diagram of an example method of updating metadata upon relocation of a sensor within the distributed sensor network.

The method blocks described above (blocks 202-210 as shown in FIGS. 2 and 12) may be used to generate initial metadata which may then be used (e.g. to control a building system in block 214) and this metadata may remain unchanged or may be automatically updated based on further sensor data, as indicated by the dotted arrow from block 212 to block 202 and as shown in FIG. 14. This enables optimization of the generated metadata based on long-term analysis of sensor data and enables the system to adapt to changes in the distributed sensor network, e.g. through addition of new sensors or relocation of existing sensors (or sensing units).

There are many ways in which the relocation of a sensor/ sensing unit may be detected (in block 1404), for example: using a vibration sensor within the sensing unit, detection of a power loss in the sensor (and not to all sensors, which might indicate a power cut), a prolonged change in the nature of the sensor data, or the generation of a new transition (e.g. in block 206). In order that the initial metadata (generated in block 1402, e.g. as shown in FIG. 2) is not corrupted following sensor relocation, the transition data (as generated in block 206) may be reset (block 1406, e.g. by deleting any stored transition data) such that going forward, the metadata is generated (in block 1408, e.g. as in blocks 202-210) based on transitions generated following the detection of the sensor relocation (in block 1404) and not on transitions generated prior to this. Where a relocation is not detected, the transition data may still be periodically reset.

The techniques which are described above for detection of relocation of a sensor may in addition, or instead, be used to detect tampering with sensors (e.g. obscuring of a sensor) or failure of a sensor. Where this is detected (e.g. by analysis engine 112) this may cause an alarm to be raised or a message to be displayed to a user.

Active Control

In the examples described above, the metadata is generated based on passively gathered data, which is typically environmental data; however in some examples, the generation of the metadata (or of initial metadata which may subsequently be updated based on passively gathered data) may be based on sensor data resulting from a degree of active control of the state of the building. This active control may be through instructions provided to an occupant of the building to ask them to take certain actions or may be through active control of a building system (e.g. through issuing control signals to further device 106 in the system shown in FIG. 1).

In an example, a user may be instructed to walk from one room to another in a specified pattern and interact with a sensor (e.g. by waving at the sensor) for a specified period of time. The resultant motion data may then be analyzed (as described above) to generate metadata. Examples of metadata that can be inferred are; the interconnectedness of the rooms, the size of the rooms, the distance between sensors, whether there are any areas that are not covered by the sensors etc. The resultant data may also be used to perform real-time relative calibration of the sensors. In another example, a user may be instructed to turn lights on/off in a particular sequence or to open and close internal doors (e.g. so that their presence can be detected using an air pressure sensor).

In another variant the model may be trained with information about the heat dissipation of a building (both internally, between and within rooms and externally to the surroundings) as a result of commands issued by the system (e.g. by controller 104) to elements of a building system. In such an example a radiator in a well interconnected room may be turned on while the building is empty and all the internal doors are open. The resultant data from temperature sensors may be used to generate metadata comprising temperature distribution and heat flow information for the building. Furthermore, additional information may be established by repeating the training scenario with different initial conditions, for example a different radiator may be turned on.

Example Applications

There are many applications of the system and method described above and many uses for the generated metadata. In a first example, the system may form part of, or provide the generated metadata to, a building's temperature control system. In such an example, the generated metadata may comprise both room adjacency information (in the form of a room adjacency graph or auto-generated floor plan) and room use patterns. This metadata may then be used to intelligently heat (or cool) rooms, or clusters of rooms, for the appropriate times of day when they are likely to be in use. Current sensor data may also be used to supplement this predictive heating to respond to unexpected room occupancy.

The intelligent heating based on the generated metadata, may be further optimized through use of thermal model data for the building which may also form part of the metadata. Standard thermal models of buildings are often inaccurate and a thermal model may have significant differences to the observed heating/cooling profile of the building as it does not take into account factors such as solar load or room occupancy. Through use of the methods described above, the sensor data received from the distributed sensors can be used to generate an initial thermal model or to improve an existing model, e.g. analysis of the sensor data can enable inference of the way windows in each building portion face (and whether there are any windows) and the thermal model can then be updated with information about the solar load.

Sensors external to the building may be used to optimize the intelligent heating control by detecting external temperature and/or sunlight which may then be factored into the heating control model. Such sensors may, for example, be located in the garden of a house, on the roof of a building or in a nearby ADSL/cable distribution box (or other services box). These external sensors may be shared between multiple systems (as a shared resource) where such intelligent heating control operates in a number of nearby buildings (e.g. a number of houses in a street).

Through use of inferred metadata to intelligently control the temperature in a building, the energy consumption can be reduced, resulting in a more environmentally friendly building and cost savings for the user.

In a second example application, the system may form part of, or provide the generated metadata to, a building's security system. Many known alarm systems use PIR sensors to detect movement. However, the systems are essentially binary in operation, when the system is armed in any given room any movement in a room over a certain threshold will trigger the alarm. When the system is disarmed the movement sensors are inactive. While this is effective when no one is expected to be moving in a room, for example if the building is unoccupied or the occupants are asleep, it is not effective in many scenarios where the building is legitimately occupied, for example it would not be effective in preventing an opportunistic burglary where a householder is home and has disarmed the movement sensors in one room but has perhaps moved into another room. The current system can be used to determine if the room is legitimately occupied, for example by determining if a householder has exited the room through the door and is in a different part of the building, and movement is detected from an unexpected location e.g. entry through a window. The methods and systems described above can therefore be implemented in an "always on" security system.

The metadata (e.g. as generated using the method of FIG. 2) may include information such as the floor plan including connectedness of the rooms. Through use of current sensor data (e.g. data from PIR sensors, microphones or any other appropriate data) in combination with the metadata, security incidents may be detected and an alarm triggered. For example, there may be a significant number of events where the data from the PIR sensor suggests that the occupants of the building enter and exit the room through the door. However, if an event occurs where sensor data from the PIR suggests that the room is entered via the window or from an unexpected or unusual location this may be considered exceptional and an alarm may be triggered. Where the metadata also comprises room use patterns, this data can also be used in determining what current sensor data is considered exceptional and should therefore trigger an alarm.

In a third example application, the inferred metadata may be used to provide localized services to a building occupant, such as in "follow me" type applications where music is played in different rooms as the user moves around the building, or messages are sent to a screen nearest the user they are intended for.

In a fourth example application, the inferred metadata may be used to automatically actuate doors and windows to manage humidity and temperature levels and to close doors and windows when rooms are not occupied or likely to be occupied for a period.

Exemplary Computing-Based Device

Figure 15:
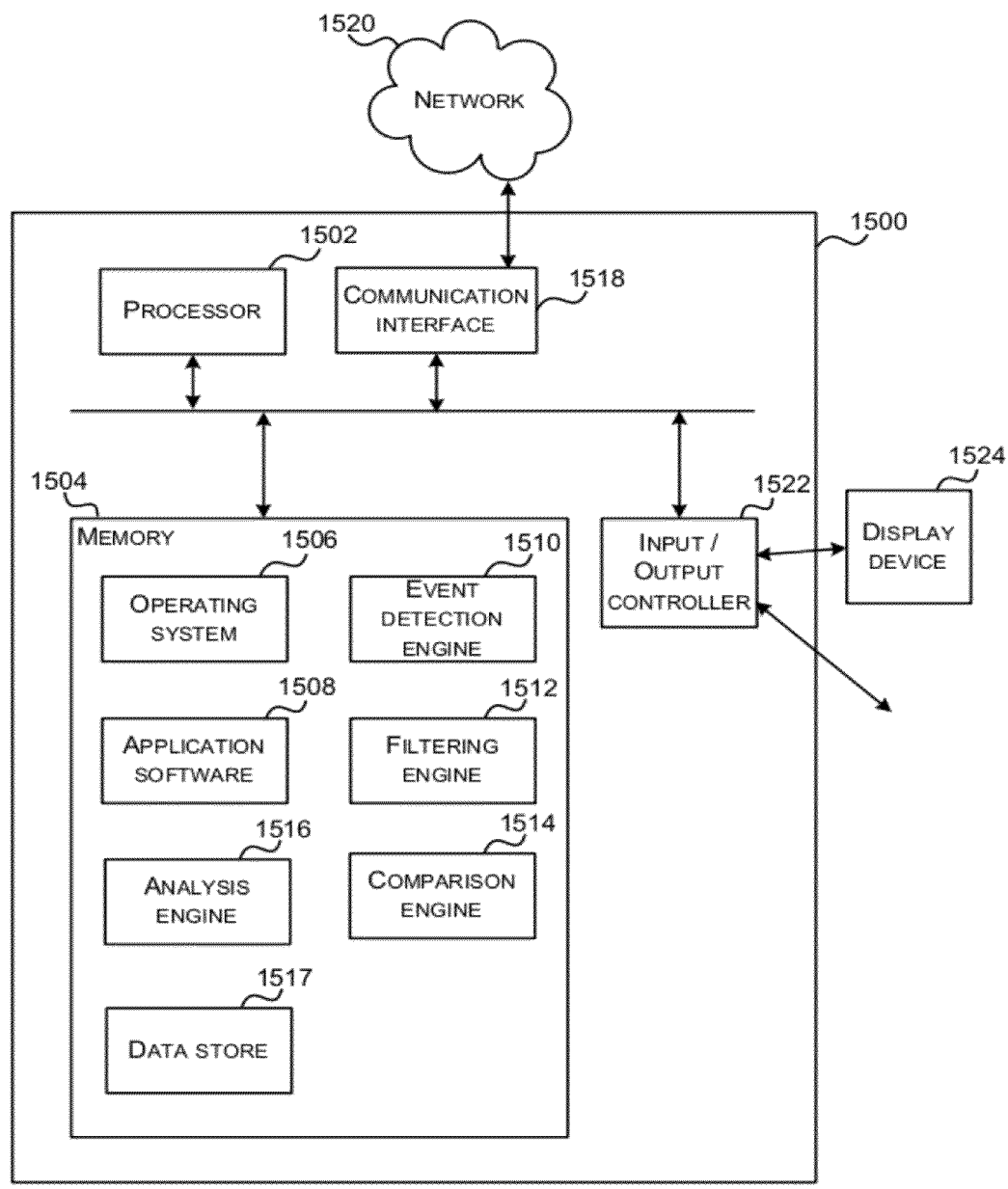
FIG. 15 illustrates an exemplary computing-based device in which embodiments of methods of inferring metadata from distributed sensor data may be implemented.

FIG. 15 illustrates various components of an exemplary computing-based device 1500 which may be implemented as any form of a computing and/or electronic device, and in which embodiments the methods of inferring metadata from distributed sensors described above may be implemented.

Computing-based device 1500 comprises one or more processors 1502 which may be microprocessors, controllers or any other suitable type of processors for processing computing executable instructions to control the operation of the device in order to infer metadata from distributed sensor networks. Platform software comprising an operating system 1506 or any other suitable platform software may be provided at the computing-based device to enable application software 1508-1516 to be executed on the device. The application software may comprise any or all of an event detection engine 1510, a filtering engine 1512, an analysis engine 1516 and a comparison engine 1514.

The computer executable instructions may be provided using any computer-readable media that is accessible by computing based device 1500 Computer-readable media may include, for example, computer storage media such as memory 1504 and communications media. Computer storage media, such as memory 1504, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1504) is shown within the computing-based device 1500 it will be appreciated that the storage may be distributed or located remotely and accessed via a network 1520 or other communication link. The memory 1504 may further comprise a data store 1517 for storing inferred metadata and/or sensor data.

Computing-based device 1500 further a communication interface 1518 which may be used to access the network 1520 or other communication link, to receive sensor data and to send control signals to remote devices which form part of a building system.

The computing-based device 1500 may also comprises an input/output controller 1522 arranged to output display information to a display device 1524 which may be separate from or integral to the computing-based device 1500. The display information may provide a graphical user interface. The input/output controller may also be arranged to receive and process input from one or more devices, such as a user input device (e.g. a mouse or a keyboard, not shown in FIG. 15). The input/output controller 1522 may also output data to devices other than the display device, e.g. the devices forming part of a building system, sensors or a locally connected printing device (not shown in FIG. 15).

CONCLUSIONS

In the systems and methods described above, the sensor data itself (which may be referred to as ambient signals) is used to generate the metadata which describes the physical arrangement of the one or more buildings in which the sensors are located. This eliminates the requirement for time-intensive manual configuration of the system to specify the detailed location of every sensor.

In the examples described above, the sensors are generally detecting environmental data in order to infer building metadata; however, in some examples, sensors may detect the presence or motion of objects carried or worn by people in the building or other non-environmental or man-made signals. The object carried/worn may be a system-specific object which generates a signature for the system described above or the object may be one that is already habitually carried by someone, such as a mobile telephone or portable computing device and the network of distributed sensors may, for example, detect Bluetooth®, GSM, WiFi or other signals transmitted by the device. The detection may be based on signal strength, time of flight or may use another technique. Where the device carried has an on-board location determination system (e.g. on-board GPS), the device may transmit its location information and this may be received by sensors or the device may be interrogated by the sensors to access the location information.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network, for example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

Although the present examples are described and illustrated herein as being implemented in a building control system, the system described is provided as an example and not a limitation. As those skilled in the art will appreciate, the present examples are suitable for application in a variety of different types of distributed sensor systems.

The invention claimed is:

1. A computer implemented method comprising:
   accessing sensor data from one of a plurality of distributed sensors, each sensor located in a respective building portion of a building;
   analyzing the sensor data to identify events indicated by a change in the sensor data;
   comparing events in sensor data from at least two of the plurality of distributed sensors to identify correlated events and for each identified correlated event, storing data representing a link between corresponding sensors; and
   analyzing the stored link data to automatically generate metadata describing a physical arrangement of the respective building portions, each respective building portion associated with at least one sensor and the physical arrangement based at least in part on the data representing links between corresponding sensors.

2. A method according to claim 1, further comprising:
   filtering the stored link data, prior to analyzing the data, by applying a threshold condition based on a number of links between pairs of sensors.

3. A method according to claim 2, wherein filtering the stored link data comprises:
   selecting a first and a second sensor from the plurality of distributed sensors;
   computing a ratio of a number of links between the first sensor to the second sensor divided by a total number of links involving a selected one of the first sensor and the second sensor; and
   excluding links between the first and second sensors from the stored link data where the ratio does not exceed a predefined value.

4. A method according to claim 1, further comprising:
   controlling a building system based at least on the generated metadata.

5. A method according to claim 4, wherein the building system is controlled based at least on the generated metadata and recent sensor data.

6. A method according to claim 4, wherein the building system comprises one of a temperature control system and a security system.

7. A method according to claim 1, wherein the metadata comprises one of a room adjacency graph and an auto-generated floor plan.

8. A method according to claim 1, wherein comparing events in sensor data from at least two of the plurality of distributed sensors to identify correlated events comprises identifying events in sensor data from at least two of the plurality of distributed sensors which occur within a predefined time interval.

9. A method according to claim 1, wherein the plurality of distributed sensors comprises sensors of a first type and wherein the method further comprises:
   accessing sensor data from one of a second plurality of distributed sensors, each sensor located in a portion of a building and comprising a sensor of a second type;
   analyzing the sensor data to identify events indicated by a change in the sensor data; and
   comparing events in sensor data from at least two of the second plurality of distributed sensors to identify correlated events based at least on a time-synchronization of event and for each identified correlated event, storing data representing a link between corresponding sensors; and
   combining the stored link data from each of the pluralities of distributed sensors prior to analyzing the stored link data.

10. A method according to claim 9, further comprising one of:
    filtering the stored link data from each of the pluralities of distributed sensors by applying a threshold condition based on a number of links between pairs of sensors, prior to combining the stored link data; and
    filtering the combined stored link data from each of the pluralities of distributed sensors by applying a threshold condition based on a number of links between pairs of sensors, prior to analyzing the stored link data.

11. A method according to claim 1, further comprising:
    analyzing the sensor data to detect relocation of a sensor; and
    updating the metadata.

12. A building control system comprising:
    an input arranged to receive sensor data from a plurality of sensors distributed among respective building portions within a building;
    an event detection engine adapted to analyze the sensor data and record events for each sensor corresponding to changes in the sensor data;
    a comparison engine adapted to compare time-stamped events for different sensors to identify correlated events and generate data representing a transition between sensors for each identified correlated event; and
    an analysis engine adapted to automatically generate a model defining the relative spatial positions of the respective building portions based on the transition data each respective building portion associated with at least one sensor and the relative spatial positions being based at least in part on the data representing transitions between sensors for the identified correlated events.

13. A system according to claim 12, further comprising:
    a filtering engine adapted to filter the transition data, prior to input to the analysis engine, based on a number of transitions between pairs of sensors.

14. A system according to claim 13, wherein the filtering engine is arranged to filter the transition data based on the number of transitions between pairs of sensors and based on a total number of transitions associated with one of the pair of sensors.

15. A system according to claim 12, further comprising:
    an output adapted to send a control signal to an element in one of a building temperature control system and a building security system based on the model and current sensor data.

16. A system according to claim 12, wherein the analysis engine is further adapted to analyze the sensor data to determine occupancy of a building portion and to predict future occupancy of the building portion based on the determined occupancy; and the system further comprises:
    an output adapted to send a control signal to a temperature control element associated with a building portion based on the model and predicted future room occupancy.

17. A system according to claim 12, wherein the plurality of sensors comprise motion sensors and the model defining the relative spatial positions of the building portions comprises a set of possible transitions between building portions and wherein the analysis engine is further adapted to analyze the sensor data in real-time to identify any transitions outside the set of possible transitions; and
    to raise an alarm on identification of a transition outside the set of possible transitions.

18. One or more tangible device-readable media with device-executable instructions that, when executed by a computing system, direct the computing system to control a building system by performing steps comprising:
    receiving sensor data from one of a plurality of distributed sensors of a first type, each sensor located in a respective building portion of a building;
    analysing the sensor data to identify events indicated by a change in the sensor data;
    comparing events in sensor data from at least two of the plurality of distributed sensors of the first type to identify events and for each identified event, storing data representing a transition between corresponding sensors;
    filtering the data representing transitions between sensors using a threshold to identify connections between building portions;
    analyzing the connections to automatically generate a representation of the spatial relationship between respective building portions, each respective building portion being associated with at least one sensor and the spatial relationship between building portions being based at least in part on the filtered data representing transitions between sensors; and
    generating a control signal for the building system based on the spatial relationship and current sensor data.

19. One or more tangible device-readable media according to claim 18, further comprising device-executable instructions that, when executed by a computing system, direct the computing system to perform steps comprising:
    receiving sensor data from one of a plurality of distributed sensors of a second type, each sensor located in a portion of a building;
    analyzing the sensor data to identify events indicated by a change in the sensor data; and
    comparing events in sensor data from at least two of the plurality of distributed sensors of the second type to identify time synchronized events and for each identified time synchronized event, storing data representing a transition between corresponding sensors;
    and wherein at least one of the filtering and analyzing steps uses transition or connection data generated using sensors of the first type and sensors of the second type.

20. One or more tangible device-readable media according to claim 19, wherein the sensors of a first type comprise PIR sensors and the sensors of the second type comprise light sensors.

* * * * *